(12) United States Patent
Havin

(10) Patent No.: US 8,539,454 B2
(45) Date of Patent: Sep. 17, 2013

(54) METHOD AND SYSTEM FOR DETECTING MEMORY LEAKS

(75) Inventor: Victor L. Havin, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 12/634,151

(22) Filed: Dec. 9, 2009

(65) Prior Publication Data

US 2011/0138367 A1    Jun. 9, 2011

(51) Int. Cl.
*G06F 9/44* (2006.01)

(52) U.S. Cl.
USPC ........................................... 717/130

(58) Field of Classification Search
USPC ........................................... 717/130
See application file for complete search history.

(56) References Cited

U.S. PATENT DOCUMENTS

| | | | |
|---|---|---|---|
| 5,644,709 A | 7/1997 | Austin | |
| 5,842,019 A | 11/1998 | Kolawa et al. | |
| 7,979,659 B2 * | 7/2011 | Obata et al. | 711/165 |
| 2007/0143562 A1 * | 6/2007 | Raut | 711/170 |
| 2008/0294853 A1 | 11/2008 | Kowlali et al. | |

OTHER PUBLICATIONS

Hackett, Brian "Memory Leak Detection Using Shape Analysis", www.cs.cornell.edu/boom/2004sp/ProjectArch/Memory%20Leak/csuglab.cornell.edu/index16.html.

* cited by examiner

*Primary Examiner* — Chun-Kuan Lee
(74) *Attorney, Agent, or Firm* — Holland & Knight LLP; Brian J. Colandreo, Esq.; Jeffrey T. Placker, Esq.

(57) ABSTRACT

A method, system, and/or computer program product for detecting memory leaks in a computer application includes instrumenting one or more software methods to increment and decrement a reference count of a software object. The reference count of the software object may be set to a predetermined count when the software object is created. The one or more software methods instrumented to increment and decrement the reference count of the software object may be executed. When the one or more software methods return from execution, the method, system, and/or computer program product may determine whether the reference count is set to the predetermined count.

17 Claims, 8 Drawing Sheets

| Reference Count | Object Address | Object Type | Other Data |
|---|---|---|---|
| 0 | 0xAAAAAAAA | Class X | X |
| 2 | 0xAAAAAAAF | Class Y | Y |
| 5 | 0xAAAAAAB9 | Class Z | Z |

602

METHOD AND SYSTEM FOR DETECTING MEMORY LEAKS

BACKGROUND OF THE INVENTION

This disclosure relates to detecting software memory leaks and, more particularly, to detecting methods that cause memory leaks in garbage collected code.

Memory leaks pose a problem in software development. Sometimes the code within a software application will allocate memory, but will never release the memory. If the software application never releases the memory, the memory is tied up and the computer system is unable to use the memory. A typical situation occurs where a software developer, using a traditional language such as C, calls the standard C function "void*malloc(size_t size)" (which allocates and reserves a block of memory) but fails to call the standard C function "void free(void*pointer)" (which de-allocates a block of memory and makes the block of memory available for use) when the memory is no longer needed. The result is that the memory is tied up and cannot be used, even though the application that tied up the memory is no longer using the memory.

Some software run-time environments attempt to prevent memory leaks by employing a garbage collection function. For example, the Java® run-time environment and the .NET™ run-time environment both include a garbage collection module (Java and all Java-based trademarks and logos are trademarks of Sun Microsystems, Inc. in the United States, other countries, or both; .NET is a trademark of Microsoft Corporation in the United States, other countries, or both). One of the garbage collector's tasks is to find memory that is no longer in use and de-allocate the memory so that it is free to be used by other software.

Garbage collectors, however, typically operate by walking through an object reference graph ("ORG") to determine if memory is currently being used. The ORG may include information about each software object in the software application as well as information about pointers to each software object, and may link software objects to the memory that they use. Typically, a garbage collector will release memory associated with an object when there are no pointers or references to the object in the object reference graph.

Memory leaks may still occur in a garbage collected environment, however. In a garbage collected environment, a memory leak may occur when an object is referenced for a long time without being used. As long as something in the ORG is referencing an object, the garbage collector cannot free the memory associated with the object. For example, an object may be assigned to a static or global variable that is never used by the software application. Since there is a reference to the object, the garbage collector cannot free the memory associated with the object, even though the object may never be used by the software application.

The object reference graph solution may also pose other problems, as well. For example, object reference graphs in many cases may be obtained only after a garbage collection. Also, each garbage collection may produce a new object reference graph. In a typical program, object reference graphs may include many objects with many links between them. An exhaustive analysis of such graph may be difficult to implement and may be time consuming. It may also be difficult to associate objects in the reference graph with code responsible for their creation. There may be no direct link between the structure of an object reference graph and the lifetime of objects in this graph. Many of the existing automatic reference graph analysis methods are based on heuristic algorithms that rely on certain assumptions and conditions, which are not universal. The object reference graph may be a large graph or file that holds a lot of information. It can be unwieldy and time consuming for a garbage collector to walk through the object reference graph searching for memory without any pointers. Also, the object reference graph may change each time the garbage collector de-allocates memory.

BRIEF SUMMARY OF THE INVENTION

In an embodiment, a method of detecting memory leaks in a computer application includes instrumenting one or more software methods to increment and decrement a reference count of a software object. The reference count of the software object is set to a predetermined count when the software object is created. The one or more software methods instrumented to increment and decrement the reference count of the software object are executed.

One or more of the following features may be included. When the one or more software methods return from execution, the method, system, and/or computer program product may determine whether the reference count is set to the predetermined count.

Incrementing the reference count of the software object may include incrementing the reference count when the software object is passed as an argument to a method, incrementing the reference count when the software object is assigned to a field, incrementing the reference count when the software object is assigned to a local variable, and/or incrementing the reference count when the software object is assigned to a static variable. Decrementing the reference count of the software object may include decrementing the reference count when a method returns, wherein the software object was passed as an argument to the method, decrementing the reference count when an LValue having the value of the software object is assigned a different value, and/or decrementing the reference count when the software object is a local variable and the program execution leaves the scope of the software object.

One of the one or more software methods responsible for incrementing or decrementing the reference count may be identified. A call graph including the one or more software methods, the reference count at the time at least one of the one or more software methods was called, and/or the reference count at the time the at least one of the one or more software methods returned may be generated. Identifying the at least one of the one or more software methods may also include monitoring an invocation path of the one or more software methods, monitoring the reference count when the at least one of the one or more software methods is called, monitoring the reference count when the at least one of the one or more software methods returns, comparing the reference count of the software object when the at least one of the one or more software methods is called to the reference count of the software object when the at least one of the one of more software methods returns, and/or identifying the at least one of the one or more software methods as a cause of a memory leak if the reference count when the at least one of the one or more software methods is called is not equal to an expected value when the at least one of the one or more software methods returns.

A table including the reference count and a memory address of the software object may be maintained.

In another embodiment, a computer program product for detecting memory leaks in a computer application is stored on a computer readable medium. The computer program product has a plurality of instructions, which, when executed by a processor, cause the processor to perform operations including instrumenting one or more software methods to increment and decrement a reference count of a software object. The reference count of the software object is set to a predetermined count when the software object is created. The one or more software methods instrumented to increment and decrement the reference count of the software object are executed.

One or more of the following features may be included. When the one or more software methods return from execution, the method, system, and/or computer program product may determine whether the reference count is set to the predetermined count.

Incrementing the reference count of the software object may include incrementing the reference count when the software object is passed as an argument to a method, incrementing the reference count when the software object is assigned to a field, incrementing the reference count when the software object is assigned to a local variable, and/or incrementing the reference count when the software object is assigned to a static variable. Decrementing the reference count of the software object may include decrementing the reference count when a method returns, wherein the software object was passed as an argument to the method, decrementing the reference count when an LValue having the value of the software object is assigned a different value, and/or decrementing the reference count when the software object is a local variable and the program execution leaves the scope of the software object.

One of the one or more software methods responsible for incrementing or decrementing the reference count may be identified. A call graph including the one or more software methods, the reference count at the time at least one of the one or more software methods was called, and/or the reference count at the time the at least one of the one or more software methods returned may be generated. Identifying the at least one of the one or more software methods may also include monitoring an invocation path of the one or more software methods, monitoring the reference count when the at least one of the one or more software methods is called, monitoring the reference count when the at least one of the one or more software methods returns, comparing the reference count of the software object when the at least one of the one or more software methods is called to the reference count of the software object when the at least one of the one of more software methods returns, and/or identifying the at least one of the one or more software methods as a cause of a memory leak if the reference count when the at least one of the one or more software methods is called is not equal to an expected value when the at least one of the one or more software methods returns.

A table including the reference count and a memory address of the software object may be maintained.

In another embodiment, a system for detecting memory leaks includes at least one processor and at least one memory coupled to the at least one processor. Computer program instructions are stored on the memory, which, when executed by the processor, cause the processor to perform operations including instrumenting one or more software methods to increment and decrement a reference count of a software object. The reference count of the software object is set to a predetermined count when the software object is created. The one or more software methods instrumented to increment and decrement the reference count of the software object are executed.

One or more of the following features may be included. When the one or more software methods return from execution, the method, system, and/or computer program product may determine whether the reference count is set to the predetermined count.

Incrementing the reference count of the software object may include incrementing the reference count when the software object is passed as an argument to a method, incrementing the reference count when the software object is assigned to a field, incrementing the reference count when the software object is assigned to a local variable, and/or incrementing the reference count when the software object is assigned to a static variable. Decrementing the reference count of the software object may include decrementing the reference count when a method returns, wherein the software object was passed as an argument to the method, decrementing the reference count when an LValue having the value of the software object is assigned a different value, and/or decrementing the reference count when the software object is a local variable and the program execution leaves the scope of the software object.

One of the one or more software methods responsible for incrementing or decrementing the reference count may be identified. A call graph including the one or more software methods, the reference count at the time at least one of the one or more software methods was called, and/or the reference count at the time the at least one of the one or more software methods returned may be generated. Identifying the at least one of the one or more software methods may also include monitoring an invocation path of the one or more software methods, monitoring the reference count when the at least one of the one or more software methods is called, monitoring the reference count when the at least one of the one or more software methods returns, comparing the reference count of the software object when the at least one of the one or more software methods is called to the reference count of the software object when the at least one of the one of more software methods returns, and/or identifying the at least one of the one or more software methods as a cause of a memory leak if the reference count when the at least one of the one or more software methods is called is not equal to an expected value when the at least one of the one or more software methods returns.

BRIEF DESCRIPTION OF THE SEVERAL VIEWS OF THE DRAWINGS

In the figures, like reference designators may denote like elements Like reference designators with different suffixes (e.g. 404a and 404b) may denote like elements with possible variations, changes, or modifications to the elements.

DETAILED DESCRIPTION OF THE INVENTION

Figure 1:
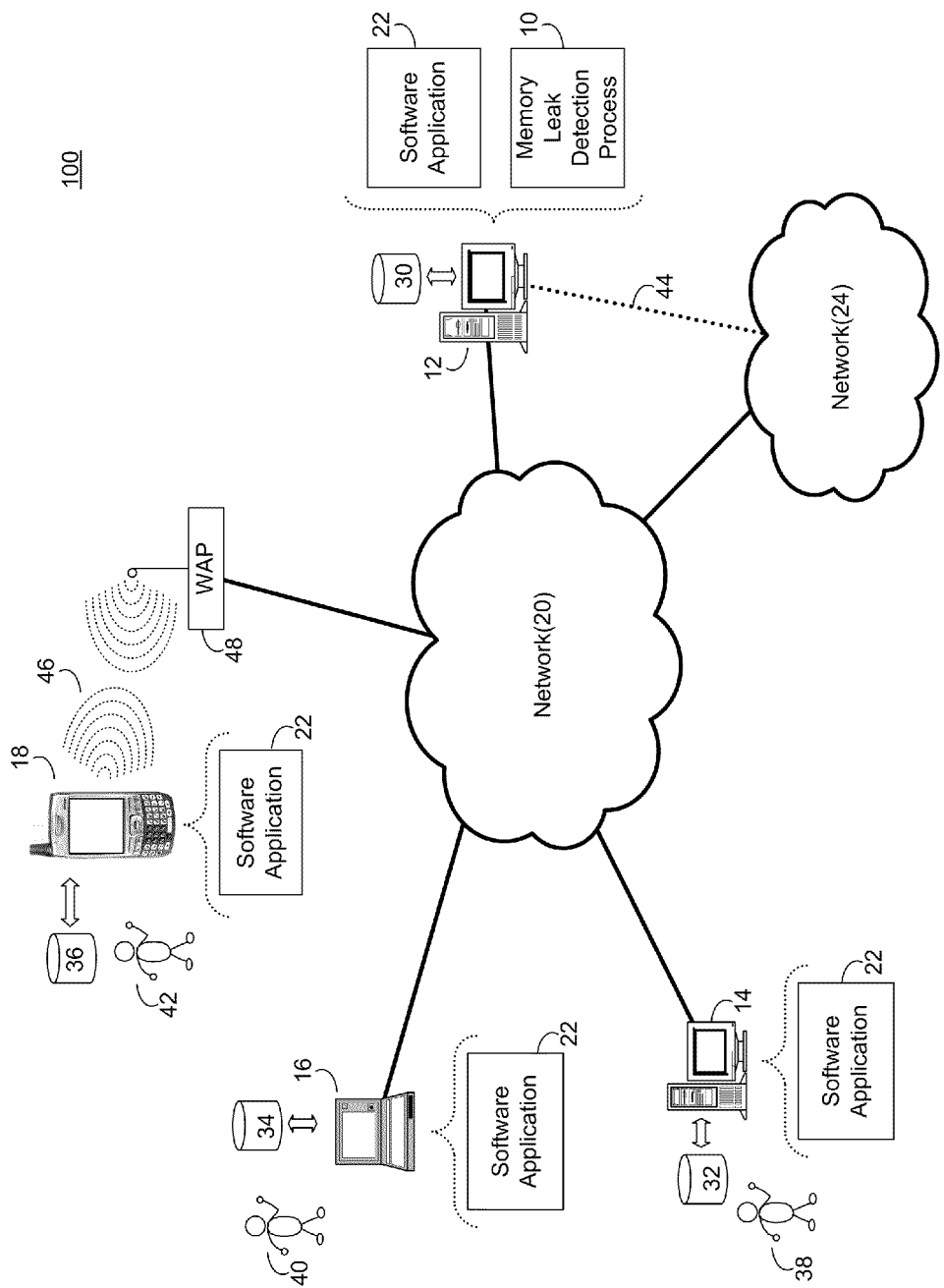
FIG. 1 is diagrammatic view of a system architecture within which a system and method for detecting memory leaks may reside.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as the Java® language, Smalltalk, C++ or the like. (Java and all Java-based trademarks and logos are trademarks of Sun Microsystems, Inc. in the United States, other countries, or both). However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory and/or computer readable storage medium that can direct a computer or other programmable data processing apparatus to function in a particular manner, such that the instructions stored in the computer-readable memory and/or computer readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 depicts a computing infrastructure within which memory leak detection process 10 may reside. As shown, memory leak detection process 10 may reside on and may be executed by computer 12. Although not shown, memory leak detection process 10 may reside on and may be executed by computer 14, laptop 16, personal digital assistant ("PDA") 18, or any other computing device capable of executing memory leak detection process 10. The various computing devices, including computers 12, 14, laptop 16, and/or PDA 18, may each be directly or indirectly connected to network 20 (e.g., the Internet or a local area network).

Computer 12 may be a server device. Computer 14, laptop 16, and PDA 18 may be end user devices. Computers 12, 14, laptop 16, and PDA 18 may run network operating systems, examples of which may include but are not limited to: Microsoft Windows XP® Server; Novell® Netware®; or Redhat® Linux®, for example (Windows XP is a registered trademark of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Computer 12 may be a server computer, such as a web server, blog server, email server, or other server that provides services to end users, for example. Server 20 may execute various server applications, which may include a web server, a file server, a file transfer protocol server, or any other kind of server application. Examples computer 12 may include, but are not limited to: a personal computer, a server computer, a series of server or personal computers, a mini computer, and a mainframe computer, for example.

FIG. 1 also depicts software application 22, which may reside on and may be executed by any appropriate computing device, including, but not limited to, computers 12, 14, laptop 16, and/or PDA 18. Software application 22 may be any type of software application. As will be discussed, software application 22 may be a software application under development by one or more software developers. Accordingly, memory leak detection process 10 may access software application 22 in order to detect memory leaks. Memory leak detection process 10 may access software application 22 directly on the computing device where software application 22 resides, or additionally/alternatively, memory leak detection process 10 may access software application 22 indirectly through network 20 and/or network 24.

As will be discussed below in greater detail, memory leak detection process 10 may instrument one or more software methods to increment and decrement a reference count of a software object. Memory leak detection process 10 may set the reference count of the software object to a predetermined count when the software object is created. Memory leak detection process 10 and/or a computing device, such as computers 12, 14, laptop 16, and/or PDA 18, may execute the one or more software methods instrumented to increment and decrement the reference count of the software object. When the software method returns from execution, memory leak detection process 10 may determine whether the reference count is set to the predetermined count.

The instruction sets and subroutines of memory leak detection process 10, which may include one or more software modules and one or more sets of software instructions, may be stored on storage device 30 coupled to computer 12, storage device 32 coupled to computer 14, storage device 34 coupled to laptop 16, and/or storage device 36 coupled to PDA 18. Memory leak detection process 10 may be executed by one or more processors and one or more memory architectures incorporated into the various electronic devices. Storage devices 30, 32, 34, 36 may include but are not limited to: hard disk drives; solid state drives; tape drives; optical drives; RAID arrays; random access memory (RAM); and a read-only memory (ROM).

The instruction sets and subroutines of memory leak detection process 10 may be generated through the use of a compiler, such as the IBM XL compiler, the Visual Studio® compiler, or an assembler, for example (Visual Studio is a registered trademark of Microsoft Corporation in the United States, other countries, or both). The instruction set and subroutines may also be generated as scripts, such as JavaScript® scripts, or as other types of software code (Java and all Java-based trademarks and logos are trademarks of Sun Microsystems, Inc. in the United States, other countries, or both). In general, and as is known in the art, the instruction sets and subroutines of memory leak detection process 10, and software applications 22 may be generated via any method of generating instruction sets and subroutines that may be executed by a processor.

As mentioned, various client electronic devices may be coupled to network 20. Examples of client electronic devices may include, but are not limited to: computer 12, computer 14, laptop 16, PDA 18, a game console (not shown), cellular telephone (not shown), and a dedicated network device (not shown). One or more users (e.g., users 38, 40, 42) may access the various tools and applications, such as memory leak detection process 10 and software application 22, from any device connected to network 20 or directly from the device on which the tool or application resides.

Various computer devices and/or client electronic devices may be coupled directly to network 20, or may be indirectly coupled to network 20 through network 24. For example, computer 12 is shown directly connected to network 20. However, computer 12 may also be indirectly connect to network 20 through secondary network 24, as illustrated by phantom link line 44.

The various client electronic devices may be directly, indirectly, and/or wirelessly coupled to network 20 (or network 24). For example, computers 12, 14, and laptop 16 are shown directly coupled to network 20 via hardwired network connections. PDA 18 is shown wirelessly coupled to network 20 via wireless communication channel 46 established between PDA 18 and wireless access point (i.e., WAP) 48, which is shown directly coupled to network 20. WAP 48 may be, for example, an IEEE 802.11a, 802.11b, 802.11g, Wi-Fi, cellular, and/or Bluetooth device that is capable of establishing wireless communication channel 46 between PDA 18 and WAP 48.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
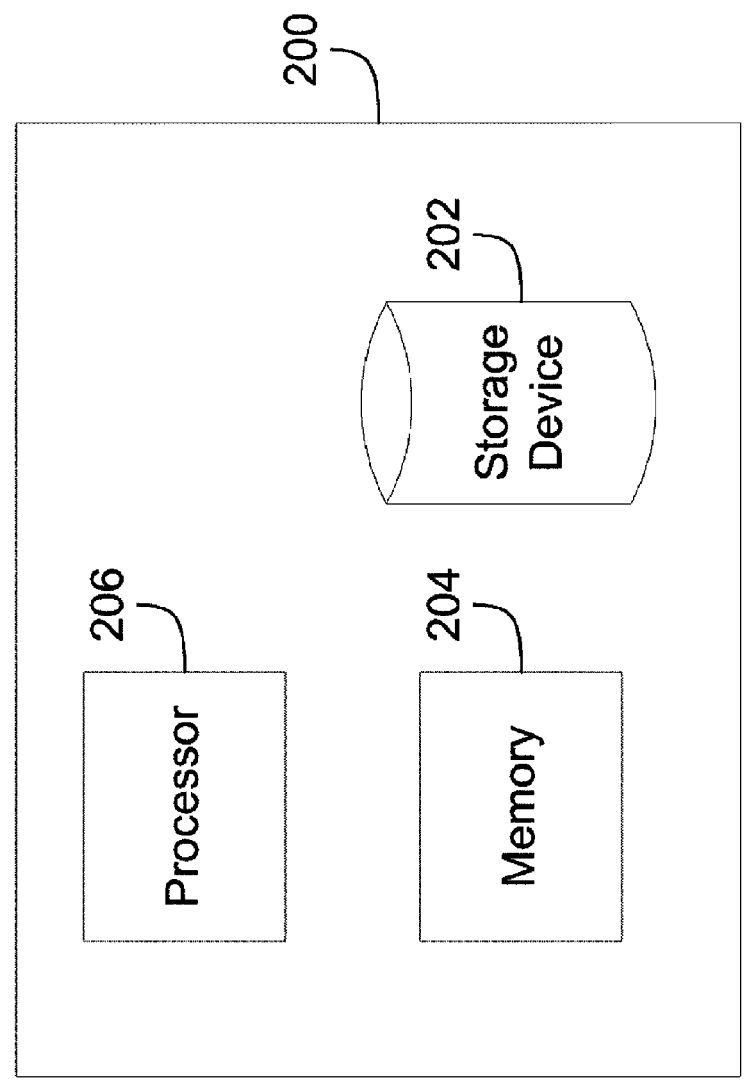
FIG. 2 is a block diagram of a computing device.

Referring to FIG. 2, FIG. 2 shows a simplified block diagram of computing device 200. Computing device 200 may be any computing device capable of executing software application 22 and/or memory leak detection process 10. Computing device 200 may include storage device 202. Storage device 202 may be a hard drive, DVD drive, CD drive, Flash memory, RAID array, or any other computer readable storage device. Computing device 200 may also include memory 204. Memory 204 may be a single memory or a series of memories. Memory 204 may be a memory device including, but not limited to, a read only memory (ROM), a random access memory (RAM), a flash memory, an EEPROM, or any other type of computer readable memory. The instruction sets and subroutines of software application 22 and/or memory leak detection process 10 may be stored in memory 204 and/or storage device 202, for example.

Computing device 200 also includes processor 206. Processor 206 may be a single processor or a series of processors. Processor 206 may be a general purpose processor, or a specialized processor. In general, processor 206 may be a processor capable of executing software. Processor 206 may be coupled to memory 204 and/or storage device 202 and may read and execute software instructions and routines stored on memory 204 and/or storage device 202. When processor 206 executes the instruction sets and subroutines of software application 22 and/or memory leak detection process 10, the instructions and subroutines may cause processor 206 to perform various operations, which will be discussed below in greater detail.

One skilled in the art will recognize that computing device 200 may also include various other parts and devices to facilitate computing operations. For example, computing device 200 may include a north bridge chip, a south bridge chip, a memory bus, an IDE or SATA bus, and various input and output buses and devices, such as a USB bus, a network interface, a mouse, a keyboard, and/or a monitor. In general, computing device 200 may be any computing device, with any computing architecture, capable of executing software application 22 and/or memory leak detection process 10.

Figure 3:
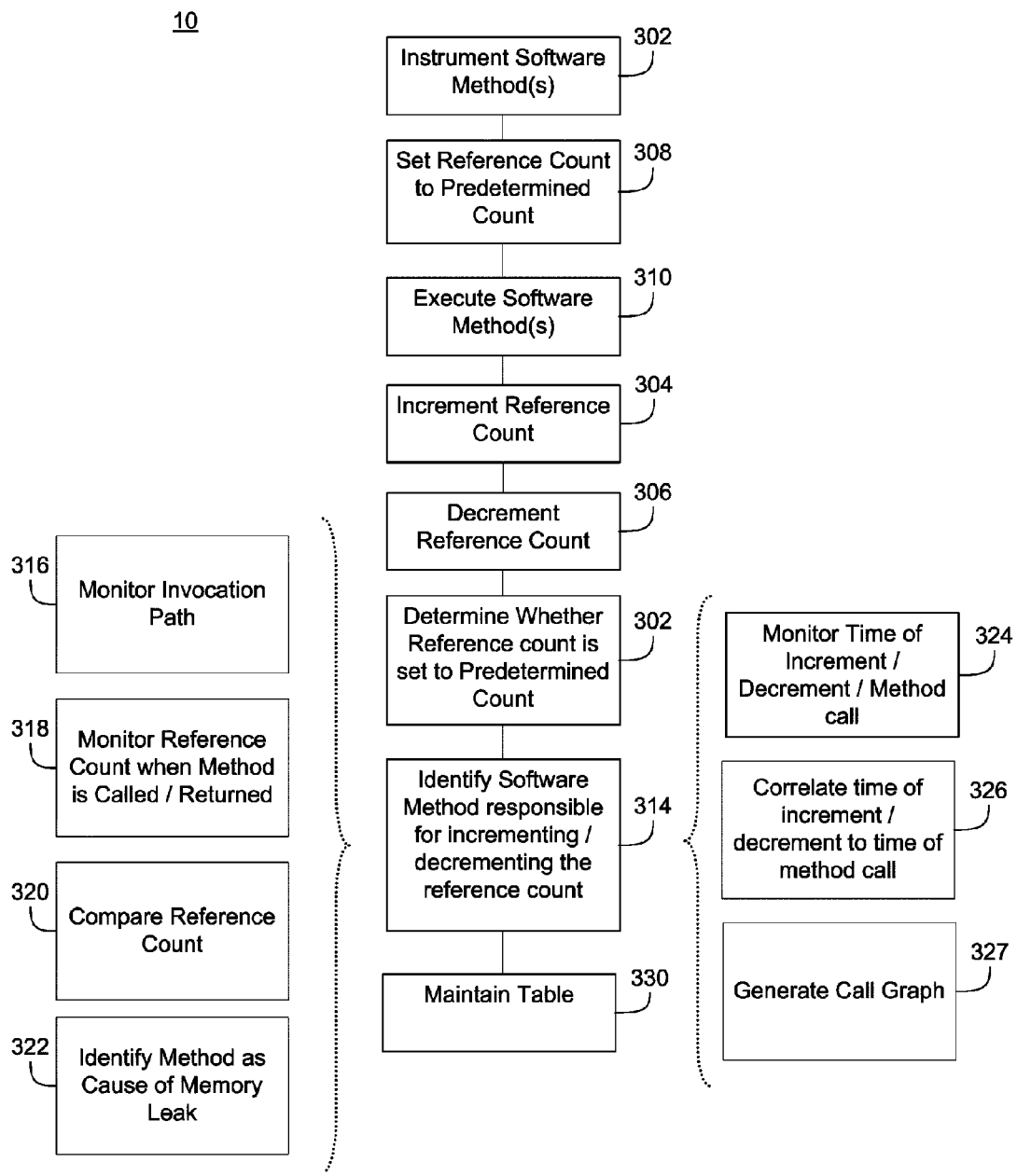
FIG. 3 is a flowchart diagram of a memory leak detection process.

FIG. 3 depicts a flowchart that includes various operations associated with memory leak detection process 10. For example, memory leak detection process 10 may instrument 302 one or more software methods, so that the software methods may increment 304 and decrement 306 a reference count of a software object. A software object may be a software class, struct, variable, method, or any other software construct that uses memory, for example. In one example, a software object may be any software object (e.g. a class, struct, variable, method, etc) that is garbage collected by a garbage collector in a managed code environment, such as the Java or .NET run-time environment. When a software object is created, memory leak detection process 10 may associate a reference count with the software object, and may set 308 the reference count of the software object to a predetermined count. Memory leak detection process may execute 310, or cause to be executed by a computing device, the one or more software methods instrumented 302 to increment 304 and decrement 306 the reference count of the software object. When the software method(s) return from execution, memory leak detection process may determine 312 whether the reference count is set to the predetermined count.

Memory leak detection process 10 may instrument 302 software methods to increment 304 and/or decrement 306 a reference count associated with a software object. As is known in the art, a method may be a software function or routine that performs operations. A software method may also be referred to as a software function, procedure, subroutine, or routine. A method may optionally receive parameters as input. A parameter may be, for example, an argument passed to a method when the method is called. In general, a parameter may be any type of software object including a native object, a class, an interface, a pointer, or any other type of software object. A method may also optionally return a value when the method has completed execution. In general, the returned value may be any type of software object including a native object, a class, an interface, a pointer, or any other type of software object. As known in the art, a method may also perform operations during its execution.

The term method is often associated with object oriented programming and, when associated with object oriented programming, may refer to a routine or procedure associated with a class or object. However, as used in this disclosure, the term method may refer to any software method, function, procedure, or routine. As used in this disclosure, a method is not necessarily required to be tied to a software class or object. While a method may be tied to a software class or object, it may also be a method or function that is not tied to a software class or object. A method may be any type of method, function, routine, or subroutine that optionally accepts parameters as arguments and optionally returns a value or object as a result.

Memory leak detection process 10 may instrument 302 one or more software methods to increment 304 and/or decrement 306 a reference count associated with a software object. Instrumenting 302 the software methods may include modifying the software methods to include instructions for incrementing 304 and/or decrementing 306 the reference count. For example, memory leak detection process 10 may add software code to a method that increments and/or decrements a reference count under certain conditions.

Instrumenting 302 the software methods may include adding one or more fields to each allocated object representing the reference count. Instrumenting 302 the software methods may also include associating one or more objects with an object descriptor structure maintained by the memory analysis tool. Additionally/alternatively, the reference count may be maintained separate from an allocated object. For example, if an object is created, a profiling interface may be used to maintain the reference count in an object table. Examples of a profiling interface include, but are not limited to, the Sun JVMTI profiling interface and the Microsoft MS COR PI profiling interface. These profiling interfaces may link object ID's of an object to an object table, and may monitor and manage a reference count associated with an allocated object.

Instrumenting 302 the software methods to increment or decrement the reference count for each object may be based on reference counting rules. For example, memory leak detection process may set a reference count to a predetermined number (e.g. 0) when an object is created.

Instrumenting 302 the software methods to increment or decrement the reference count for each object may include modifying intermediate code generated by a compiler. For example, a compiler may generate intermediate code such as Java bytecode and/or a managed windows PE file containing Microsoft IL instructions. Instrumenting 302 the software methods to increment or decrement the reference count may include adding instructions/bytecode to compiled Java bytecode and/or instructions/bytecode to compiled Microsoft IL instructions, and/or adding instructions/bytecode to any type of intermediate code generated by a compiler.

Memory leak detection process may increment the reference count when: the software object or a reference to the software object is passed as an argument to a method, the software object or a reference to the software object is assigned to a field or a local variable, and/or the software object or a reference to the software object is assigned to a static variable.

Memory leak detection process 10 may decrement the reference count when: a method having the software object in the argument list returns, an Lvalue having an object reference acquires a different value, and/or when a local variable goes out of the scope, for example.

Memory leak detection process 10 may also set the reference count of the null object to a predetermined value (e.g. 0). In one example, the reference count of the null object may always be set to zero.

Additionally/alternatively, if software application 22 is written with managed code (such as the Java or C# languages), memory leak detection process 10 may instrument 302 the software methods by modifying the runtime environment and/or a virtual machine that executes the managed code. Examples of a runtime environment and/or a managed code environment include the Java run-time environment and the .NET run-time environment. Examples of a virtual machine include the Java Virtual Machine (JVM) and the Common Language Runtime included in the .NET framework. Typically, as is known in the art, in a managed code environment, the run-time environment may maintain an object reference graph, which may keep track of various information relating to objects and/or methods during execution. Memory leak detection process 10 may, for example, modify or provide a modified runtime environment that increments 304 and/or decrements 306 a reference count of an object, or that automatically instruments 302 software methods to increment 304 and/or decrement 306 a reference count associated with an object.

Additionally/alternatively, memory leak detection process 10 may instrument 302 the software methods by modifying a compiler that compiles the software methods. For example, memory leak detection process 10 may modify or provide a modified compiler (such as a C# or Java compiler) that automatically modifies the software methods during the compilation process. As the compiler produces executable or interpretable code, the compiler may add instructions to the code that instrument software methods in the code (by, for example, producing machine code or bytecode that includes the added instructions), so that the software methods may increment 304 and/or decrement 306 a reference count associated with a software object.

Memory leak detection process 10 may increment 304 and/or decrement 306 the reference count when certain events take place within the software methods (e.g. within software application 22). In one embodiment, the reference count may coincide with the number of objects, methods, variables, or other software constructs that currently reference a software object during any point in time while software application 22 is executing. For example, a pointer (1), a method (2), and a data structure (e.g. a class) (3) all reference the software object, the reference count may be three (3). If, during execution of software application 22, another pointer is assigned the address of the software object, the reference count may be incremented 304 to four (4), indicating that four software constructs are currently referencing the software object. Conversely, if the reference count is four (4), and a pointer is modified so it no longer points to the software object, the reference count may be decremented 306 to three (3), indicating that three software constructs are currently referencing the software object. Of course, one skilled in the art will recognize that any numeric or non-numeric code may be used to indicate the number of software constructs currently referencing the software object. For example, the reference count may be a positive number, a negative number, an alphanumeric, or any other symbol that may represent the number of references to a software object.

In one example, memory leak detection process 10 may increment 304 the reference count upon the occurrence of certain events, e.g. whenever the number of references to the software object is increased. As discussed, memory leak detection process 10 may set the reference count to a predetermined count, say zero, when the software object is first created. Memory leak detection process 10 may then increment 304 the reference count upon the occurrence of certain events. For example, memory leak detection process 10 may increment 304 the reference count for the software object when the software object is passed as an argument to a method because, for example, when the software object is passed as a parameter or argument to a method, the method may reference and/or use the object. Accordingly, memory leak detection process 10 may increment 304 the reference count when the software object is passed as a parameter or argument to a method.

Memory leak detection process 10 may also increment 304 the reference count when the software object is assigned to a field. A field may be a variable associated with a data object, such as a class or struct. Classes may typically include methods and data fields. Structs may also typically include data fields. When the software object is assigned to a field within a class or struct, for example, memory leak detection process 10 may increment 304 the reference count, because, once assigned, the class or struct may reference the software object.

Memory leak detection process 10 may also increment 304 the reference count when the software object is assigned to a local variable. A local variable may be any locally declared software variable or LValue capable of containing the software object and/or the address of the software object. The local variable may have a scope limited to a function, class, method, namespace, or other section of software code. The local variable may a native variable, a class, a field within a class, a struct, a field within a struct, an array, an element of an array, a pointer, or any other type of variable capable of containing the software object and/or the address of the software object.

Memory leak detection process 10 may also increment 304 the reference count when the software object is assigned to a static variable. As is known in the art, a static variable may be a variable that has a lifetime that extends across the entire lifetime of an application, for example. Additionally/Alternatively, a static variable may be a variable that exists in one memory location and is accessible globally, and/or accessible by all instances of a class, and/or accessible by a method that creates the static variable and any sub-methods that are called by the method, etc. Like a local variable, a static variable may be any type of software construct capable of containing, holding, or pointing to the software object, including, but not limited to: a native variable, a class, a struct, an array, an element of an array, a pointer, or any other type of static variable capable of containing, holding, and/or pointing to the software object.

Memory leak detection process 10 may also decrement 306 the reference count for the software object upon the occurrence of certain events. For example, memory leak detection process 10 may decrement 306 the reference count when a method which was passed the software object as a parameter or argument returns. When the software object is passed as a parameter or argument to a method, the method references (and possibly makes use of) the software object. However, when the method completes its execution and returns, the method no longer references (and/or makes use of) the software object. Accordingly, when a method that takes the software object as a parameter or argument returns, memory leak detection process 10 may decrement 306 the reference count.

Memory leak detection process 10 may also decrement 306 the reference count when an LValue having the value of the software object is assigned a different value. An LValue may be the value on the left side of an assignment statement. For example, the integer X in the following statement is an LValue, because it is the value on the left side of an assignment:

int X=5;

As another example, the following statement assigns software object "bar" to the LValue "foo."

class Y foo=bar;

In this example, "bar" may be an instance of class Y. When the instance/software object "bar" is assigned to the identifier "foo," the instance "bar" is referenced by the LValue/identifier "foo." As discussed above, when the assignment takes place and the reference is created, memory leak detection process 10 may increment 304 the reference count associated with software object "bar." However, if the LValue foo is assigned another software object, memory leak detection process 10 may decrement 306 the reference count associated with software object "bar." For example, the following statement assigns another software object named "objectX" to the LValue foo:

foo=objectX;

Since the LValue foo is assigned a different value, the LValue foo no longer references software object "bar." Accordingly, when the LValue foo is assigned a different value, memory leak detection process 10 may decrement 306 the reference count associated with software object "bar." One skilled in the art will recognize that the LValue may be an LValue for any type of software object, including, but not limited to: a native variable, a class, a struct, an array, an element of an array, a pointer, or any other type of static variable capable of containing, holding, and/or pointing to the software object.

Memory leak detection process 10 may also decrement 306 the reference count when the software object is a local variable, and the program execution leaves the scope of the software object. For example, if a method, when called, creates the software object, the software object may exist only within the method's scope. Accordingly, when the method returns, the scope of the method may end, and memory leak detection process 10 may decrement 306 the reference count associated with the software object. Decrementing 306 the reference count when the program execution exit's the software object's scope may be particularly applicable for managed and/or garbage collected code. For example, in managed and/or garbage collected code, the software object may not be automatically deleted when the method that created the software object returns. Rather, the software object may continue to exist in memory until the garbage collector disposes of the software object. The following code segment may illustrate the software object's scope. Assume the following code is written in managed and/or garbage collected code:

```
1. void method m ( ) {
2. Object SofOb = new Object( );
3. <Perform operation 1>
4. <Perform operation 2>
5. return;
6. }
```

Line 1 in the code segment defines and/or declares method "m." In line 2, software object "SofOb" is created. Since software object "SofOb" is created within method "m," software object "SofOb" only exists within the scope of method "m." Therefore, when method "m" reaches line 5 and returns from execution, method "m" no longer references software object "SofOb." Therefore, when method "m" returns and/or the program execution goes outside the scope of software object "SofOb," memory leak detection process 10 may decrement 306 the reference count associated with software object "SofOb."

Memory leak detection process 10 may also identify 314 one or more software methods responsible for incrementing 304 and/or decrementing 306 the reference count. Identifying 312 the software methods responsible for incrementing 304 and decrementing 306 the reference count may aid memory leak detection process in detecting a memory leak and identifying software code responsible for the memory leak.

Figure 4A:
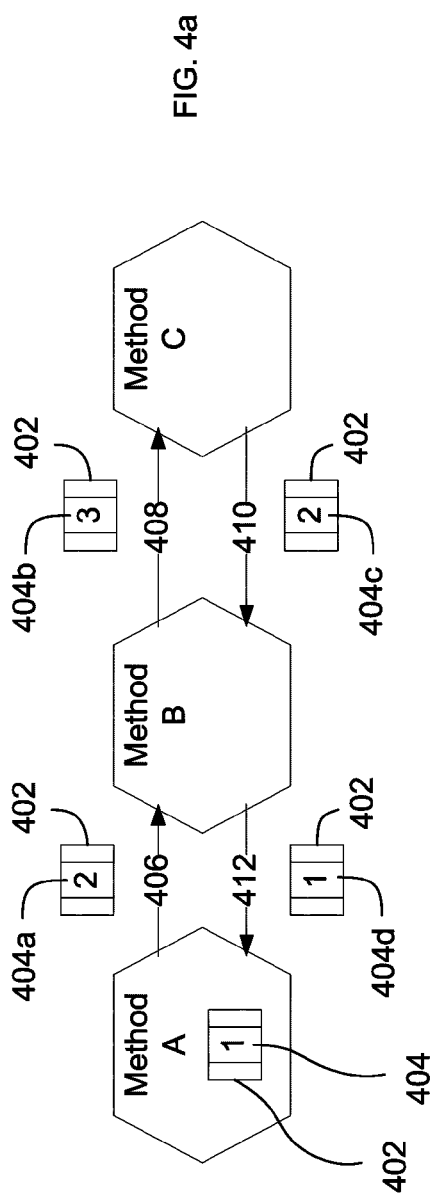
FIGS. 4a-4b are flowchart models of a method invocation sequence.

To illustrate, FIG. 4a depicts a method invocation path where no memory leak occurs. A method invocation path may refer to a series or sequence of method calls. FIG. 4a depicts a method invocation path where method A may call method B (as shown by arrow 406), which may call method C (as shown by arrow 408). Then, method C may return execution to method B (as shown by arrow 410), and method B may return execution to method A (as shown by arrow 412).

As discussed, FIG. 4a depicts a method invocation path where no memory leak occurs. In FIG. 4a, method A creates software object 402. When method A creates software object 402, the reference count 404 for software object 402 is shown as one (1) because, in this example, when software object 402 is created by method A, method A assigns software object 402 to a local variable and/or and LValue. Subsequently, method A may call method B and passes software object 402 as a parameter to method B as shown by arrow 406. As discussed above, when method A calls method B, memory leak detection process 10 may increment 304 reference count 404 so that reference count 404a equals two (2), as shown in FIG. 4a. Subsequently, method B may call method C and pass software object 402 as a parameter to method C, as shown by arrow 408. Accordingly, memory leak detection process 10 may increment 304 reference count 404a so that reference count 404b equals three (3) (because software object 402 now has three references: it is reference by the local variable in method A, by method B, and by method C).

When method C returns from execution, as shown by arrow 410, memory leak detection process 10 may decrement 306 reference count 404b so that reference count 404c equals two (2). Similarly, when method B returns from execution, as shown by arrow 412, memory leak detection process 10 may decrement 306 reference count 404c so that reference count 404d equals one (1). No memory leak appears to have occurred within methods B and C because, when software object 402 was created, reference count 404 was equal to one (1), and when methods B and C returned, reference count 404d was again equal to one (1).

Figure 4B:
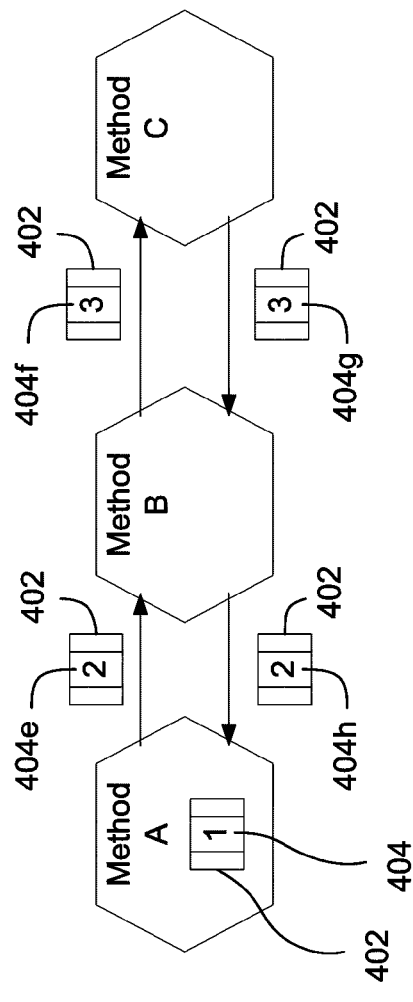

FIG. 4b depicts a method invocation path where a memory leak may occur. In FIG. 4b, method A calls method B, which calls method C. When method C is called, as shown by arrow 414, reference count 404f is three (3). Therefore, when method C returns, as shown by arrow 416, reference count 404g should be two (2). However, in FIG. 4b, when method C returns, reference count 404 is three (3). This shows that an operation may have occurred within method C that incremented 304 the reference count, but that an operation that should have decremented the reference count did not occur. For example, method C may have assigned software object 402 to a static variable LValue. As discussed, if method C assigned software object 402 to a static variable created by method C, memory leak detection process may increment 304 the reference count. The following code segment may illustrate the issue:

```
void method C ( Object SofOb ) {
    static Object O = SofOb;
    return;
}
```

In the preceding code, method C assigns software object SofOb to a static variable, which (as discussed) will result in incrementing the reference count for SofOb. However, method C may not set the static variable O to another value (which would have resulted in decrementing the reference count). Therefore, when method C returns, the static variable O may still reference the software object. In this scenario, the reference count associated with the software object may be incremented, but never decremented. Of course, the code above is only one example of how a reference count of a software object can be incremented and not decremented. One skilled in the art will recognize that other operations may also result in the reference count being incremented but not decremented.

Turning back to FIG. 4b, when method C returns, reference count 404g should be two (2). However, in FIG. 4b, when method C returns, reference count 404g is three (3). The additional reference attached to software object 402 may indicate a potential memory leak caused by method C.

Memory leak detection process 10 may identify 314 a software method responsible for causing a memory leak by monitoring 316 a method invocation path. As discussed, FIG. 4b depicts a method invocation path where a memory leak may occur. Memory leak detection process 10 may, for example, monitor 318 reference count 404 when each method is called and/or when each method is returned. Memory leak detection process 10 may also compare 320 the reference count at the time a method is called to the reference count at the time a method returns. In FIG. 4b, memory leak detection process 10 may compare the value of reference count 404f at the time method C is called (i.e. a value of three (3)), to the value of reference count 404g at the time method C returns (i.e. a value of three (3)). Because the value of reference count 404f at the time method C is called is three (3), memory leak detection process may expect the value of reference count 404g at the time method C returns to be two (2). In other words, the expected value of reference count 404g when method C returns may be two (2), in this example. If memory leak detection process 10 monitors 318 the reference count when method C returns, memory leak detection process 10 may identify 322 method C as a cause of a memory leak because the value of reference count 404g at the time method C returns should be two (2), and not three (3).

Memory leak detection process 10 may compare 320 the reference count at the time a software method is called and at the time the software method returns. In one example, if the reference count at the time the software method returns is greater than the reference count at the time the software method was called, or if the reference count at the time the software method returns is not equal to an expected value, then memory leak detection process 10 may identify the software method as the cause of a memory leak, and/or may identify methods called by the software method as the cause of the memory leak.

Figures 5, 6:
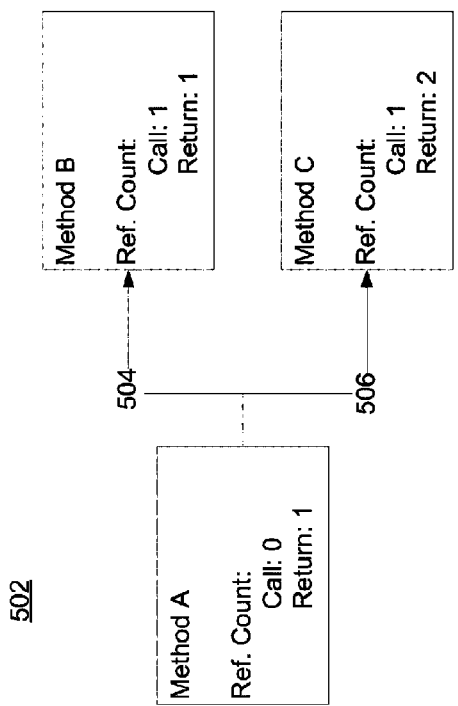
FIG. 5 is a diagrammatic view of a call graph.
FIG. 6 is a table diagram of a table including reference counts and software objects.

The reference count may also be projected on a call graph, which may provide a hierarchical distribution of reference counts for a sequence of software methods. A call graph may be a series or sequence of method calls that provide information about a reference count at the time various methods were called and/or returned. Memory leak detection process 10 may use one or more reference counts included within a call graph to identify a method or segment of software code responsible for a memory leak, for example. FIG. 5 shows an example of a call graph. Memory leak detection process 10 may generate 327 a call graph that includes reference counts for one of more software objects at the time a software method was called and/or returned. For example, call graph 502 shows a call graph that may identify software method A and/or software method C as the cause of a memory leak. As shown in FIG. 5, the reference count may be zero (0) at the time method A is called, but may be one (1) at the time method A returns. Memory leak detection process 10 may then identify method A as the cause of a memory leak.

As shown in FIG. 5, Method A also calls Method B and Method C, as shown by arrows 504, 506. Memory leak detection process 10 may not identify Method B as the cause of a memory leak because the reference count at the time Method B is called is one (1), and the reference count the time Method B returns is also one (1). However, memory leak detection process 10 may identify Method C as the cause of a memory leak because the reference count at the time Method C is called is one (1), and the reference count at the time Method C returns is two (2). Accordingly, memory leak detection process 10 may identify a method invocation path that includes Method A and Method C (but not Method B in this example), as the cause of a memory leak. A method invocation path may be a series or sequence of method calls. In this example, the method invocation path that includes Method A and Method C may be identified as the cause of a memory leak. By projecting/including reference counts in a call graph, memory leak detection process 10 may identify software methods and/or software code responsible for increasing with value of the reference counts and/or preventing the reference counts from decreasing in value. Software methods and/or software code responsible for increasing the value of the reference counts and/or preventing the reference counts from decreasing in value may be responsible for memory leaks in a garbage collected run-time environment because the software methods and/or software code may cause the number of references to a software object to increase, or prevent the number of references to an object from decreasing. If the number of references to a software object increases without subsequently decreasing, a garbage collector may not dispose of the software object, which may result in a memory leak.

Reference counters in the call graph may include links to code fragments and/or software methods responsible for memory leaks.

Memory leak detection process 10 may monitor one or more software objects and one or more reference counts simultaneously. Memory leak detection process 10 may, for example, maintain 328 a table of reference counts and software objects. FIG. 6 shows an exemplary table for monitoring reference counts and software objects. Table 602 includes a column for reference counts, a column for software object addresses, a column for software object type, and a column for other data. One skilled in the art will recognize that table 602 may contain very minimal data (e.g. only the reference count and an identifier of the software object and/or memory associated with the software object), or that table 602 may contain additional data, such as object size, location, type, etc.

As discussed, most managed code and/or garbage collected environments maintain an object reference graph. An object reference graph may contain large amount of information making it difficult to quickly and efficiently detect memory leaks in an application. In contrast memory leak detection process 10 may only require an identifier of the software object and/or memory associated with the software object to detect memory leaks. Therefore, memory leak detection process 10 may be more efficient than a typical ORG/managed code solution. A developer may be able to use memory leak detection process 10 to quickly and efficiently detect memory leaks in a managed code and/or a garbage collected software environment.

Figure 7:
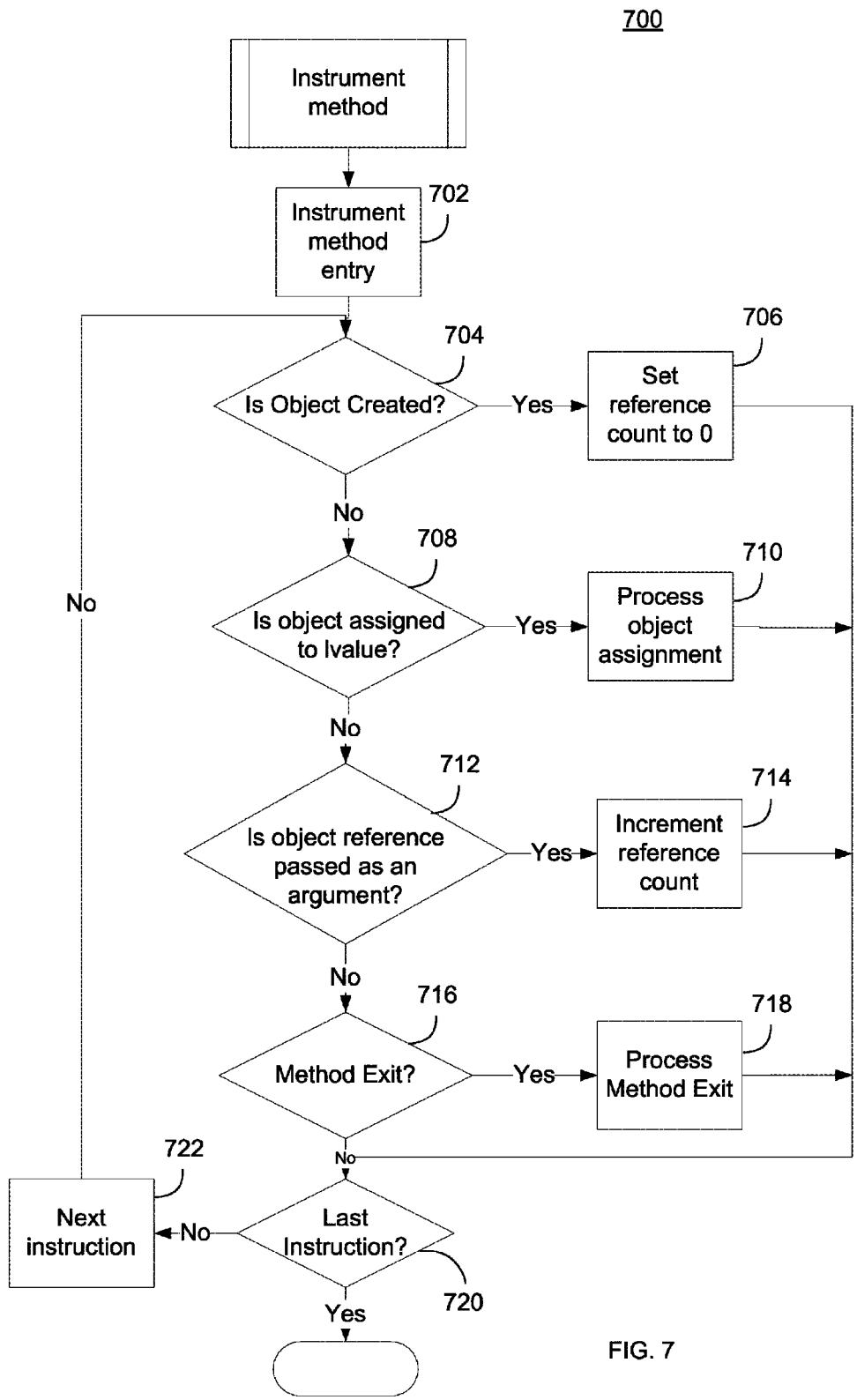
FIG. 7 is a flowchart diagram of an instrumented method.
Figure 8:
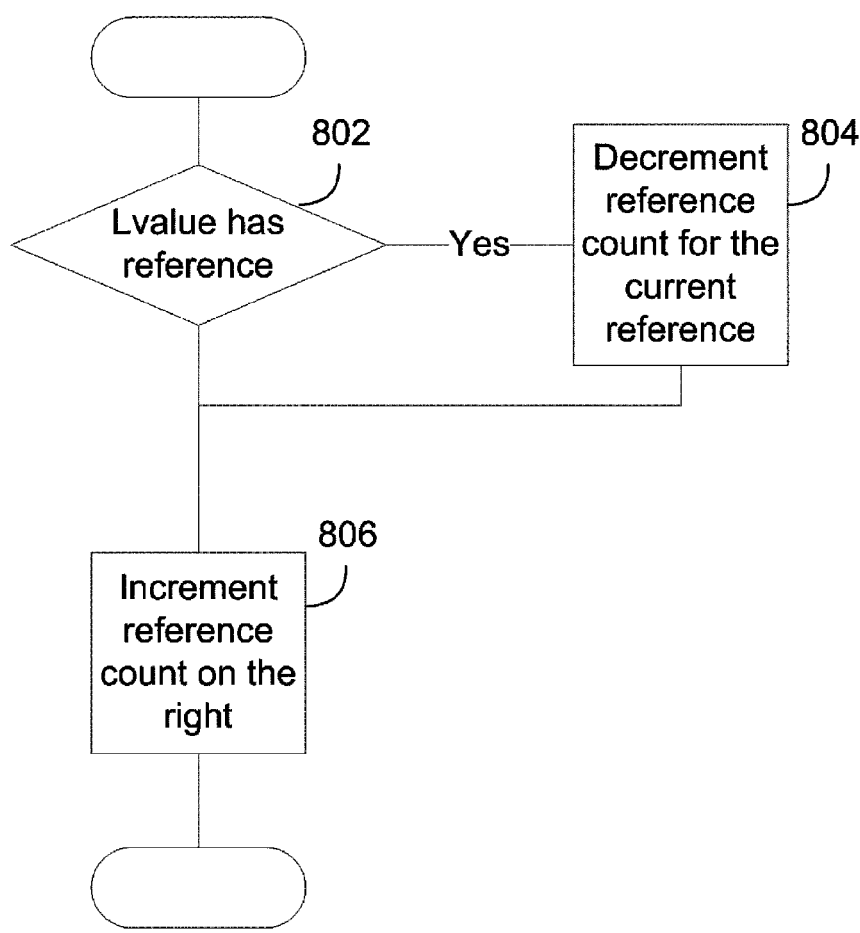
FIG. 8 is a flowchart diagram of an instrumented method.
Figure 9:
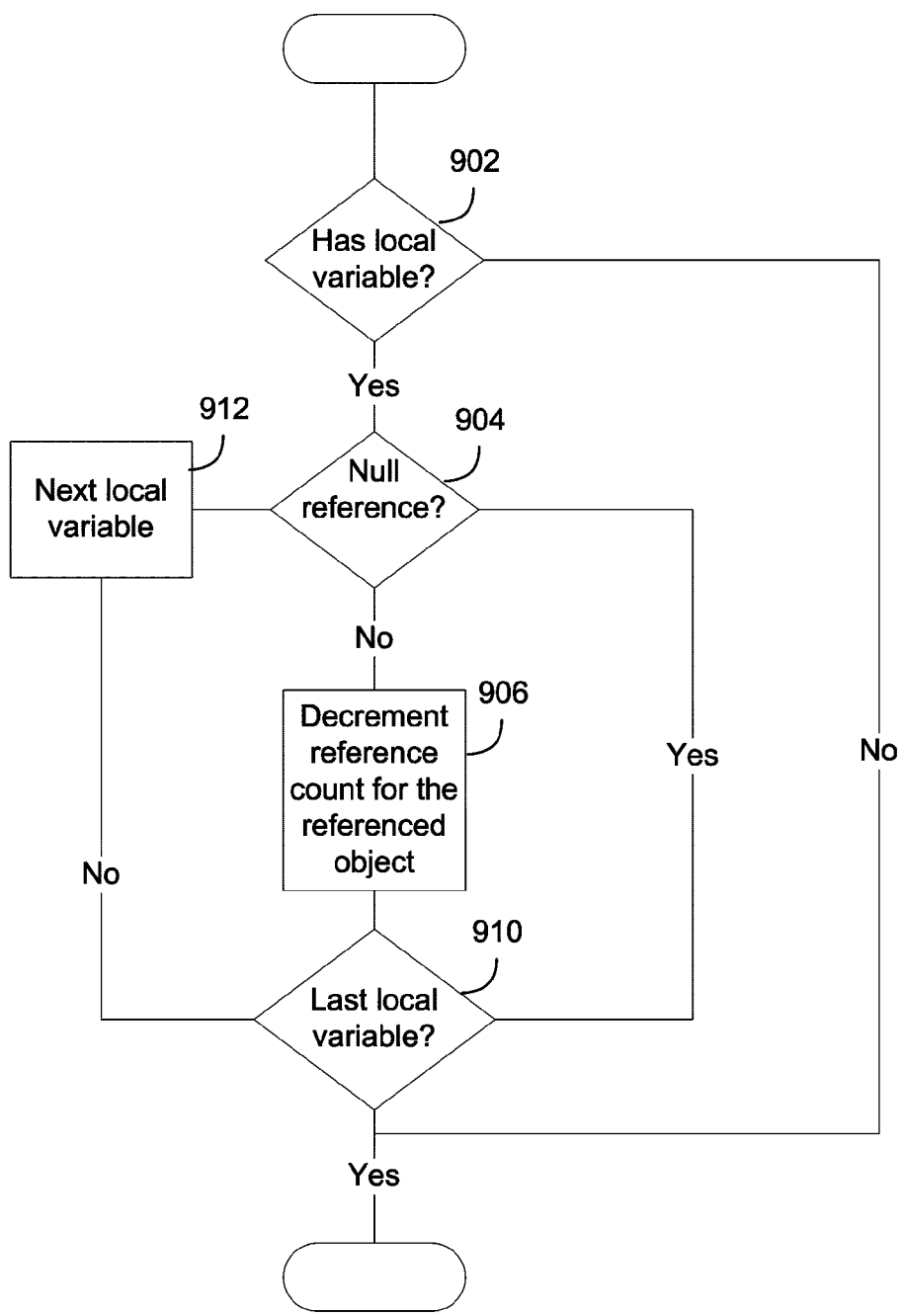
FIG. 9 is a flowchart diagram of an instrumented method.

As discussed, memory leak detection process 10 may set 308 a reference count to a predetermined count, and may instrument 302 software methods to increment 304 and decrement 306 a reference count. FIGS. 7-9 depict flowchart diagrams that may illustrate a process followed by software method 700, which may be instrumented 302 to increment 304 and decrement 306 a reference count.

FIG. 7 may depict a portion of the process followed by software method 700. As shown, upon software method entry 702, software method 700 may check if an object is created by software method 700, as shown in box 704. If the object is created, software method 700 may set the reference count for the object to zero, as shown in box 706. If the object is not created by software method 700, software method 700 may check to see if the object is assigned to an LValue by software method 700, as shown by box 708. If the object is assigned to an LValue by software method 700, software method 700 may process the object assignment, as shown by box 710. If the object is not assigned to an LValue by software method 700, software method 700 may check to see if a reference to the object is passed as an argument, as shown by box 712. If the reference to the object is passed as an argument, software method 700 may increment 304 the reference count, as shown by box 714. If the reference to the object is not passed as an argument, software method 700 may check to see if software method 700 is exiting, as shown by box 716. If software method 700 is exiting, software method 700 may process the exit of software method 700, as shown by box 718. If software method 700 is not exiting, software method 700 may check to see if the current instruction is the last instruction, as shown by box 720. If the current instruction is not the last instruction, software method 700 may go to the next instruction, as shown by box 722, and may repeat the process. FIG. 7 depicts one example of a flowchart process executed upon entry of an instrumented 302 software method.

FIG. 8 may depict a process executed as part of box 710 (Process Object Assignment) discussed above. As shown by FIG. 8, software method 700 may check whether an LValue has a reference, as shown by box 802. If the LValue has a reference, software method 700 may decrement 306 the reference count of the object already assigned to the LValue, as shown by box 804. Then, software method 700 may increment 304 the reference count of the object newly assigned to the LValue, as shown by box 806.

FIG. 9 may depict a process executed as part of box 718 (Process Method Exit) discussed above. As shown, software method 700 may check to see if software method 700 has a local variable, as shown by box 902. If software method 700 has a local variable, software method 700 may check to see if the local variable is a null reference, as shown by box 904. If the local variable is not a null reference, software method 700 may decrement 306 the reference count for the object referenced by the local variable, as shown by box 906. Software method 700 may check to see if the current local variable is the last local variable, as shown by box 910. If the current local variable is not the last local variable, software method 700 may repeat the process for the next local variable, as shown by box 912.

The number and order of boxes in the various flowchart diagrams are not intended to be limitations of the invention; one skilled in the art will recognize that the flowchart process may include additional or fewer boxes, which may be in any appropriate order.

A number of implementations have been described. Nevertheless, it will be understood that various modifications may be made. Accordingly, other implementations and other uses are within the scope of the following claims.

What is claimed is:

1. A method of detecting memory leaks in a computer application comprising:
   instrumenting one or more software methods to increment and decrement a reference count of a software object;
   setting the reference count of the software object to a predetermined count when the software object is created;
   executing, by a memory leak detection system, the one or more software methods instrumented to increment and decrement the reference count of the software object, wherein incrementing the reference count of the software object comprises one or more of:
      incrementing the reference count when the software object is passed as an argument to a method;
      incrementing the reference count when the software object is assigned to a field;
      incrementing the reference count when the software object is assigned to a local variable; and
      incrementing the reference count when the software object is assigned to a static variable; and
   when the one or more software methods return from execution, determining whether the reference count is set to the predetermined count.

2. The method of claim 1 wherein decrementing the reference count of the software object comprises one or more of:
   decrementing the reference count when a method returns, wherein the software object was passed as an argument to the method;
   decrementing the reference count when an LValue having the value of the software object is assigned a different value; and
   decrementing the reference count when the software object is a local variable and the program execution leaves the scope of the software object.

3. The method of claim 1 further comprising identifying at least one of the one or more software methods responsible for incrementing or decrementing the reference count.

4. The method of claim 3 wherein identifying the at least one of the one or more software methods includes:
   generating a call graph including:
   the one or more software methods;
   the reference count at the time at least one of the one or more software methods was called; and
   the reference count at the time the at least one of the one or more software methods returned.

5. The method of claim 3 wherein identifying the at least one of the one or more software methods includes:
   monitoring an invocation path of the one or more software methods;
   monitoring the reference count when the at least one of the one or more software methods is called;
   monitoring the reference count when the at least one of the one or more software methods returns;
   comparing the reference count of the software object when the at least one of the one or more software methods is called to the reference count of the software object when the at least one of the one of more software methods returns; and
   identifying the at least one of the one or more software methods as a cause of a memory leak if the reference count when the at least one of the one or more software methods is called is not equal to an expected value when the at least one of the one or more software methods returns.

6. The method of claim 1 further comprising maintaining a table, the table including the reference count and a memory address of the software object.

7. A computer program product for detecting memory leaks in a computer application, stored on a non-transitory computer readable storage medium, having a plurality of instructions stored thereon, which, when executed by a processor, cause the processor to perform operations comprising:
   instrumenting one or more software methods to increment and decrement a reference count of a software object;
   setting the reference count of the software object to a predetermined count when the software object is created;
   executing, by a memory leak detection system, the one or more software methods instrumented to increment and decrement the reference count of the software object, wherein incrementing the reference count of the software object comprises one or more of:
      incrementing the reference count when the software object is passed as an argument to a method;
      incrementing the reference count when the software object is assigned to a field;
      incrementing the reference count when the software object is assigned to a local variable; and
      incrementing the reference count when the software object is assigned to a static variable; and when the one or more software methods return from execution, determining whether the reference count is set to the predetermined count.

8. The computer program product of claim 7 wherein decrementing the reference count of the software object comprises one or more of:
- decrementing the reference count when a method returns, wherein the software object was passed as an argument to the method;
- decrementing the reference count when an LValue having the value of the software object is assigned a different value; and
- decrementing the reference count when the software object is a local variable and the program execution leaves the scope of the software object.

9. The computer program product of claim 7 wherein the operations further comprise identifying at least one of the one or more software methods responsible for incrementing or decrementing the reference count.

10. The computer program product of claim 9 wherein identifying the at least one of the one or more software methods includes:
- generating a call graph including:
- the one or more software methods;
- the reference count at the time at least one of the one or more software methods was called; and
- the reference count at the time the at least one of the one or more software methods returned.

11. The computer program product of claim 9 wherein identifying the at least one of the one or more software methods includes:
- monitoring an invocation path of the one or more software methods;
- monitoring the reference count when the at least one of the one or more software methods is called;
- monitoring the reference count when the at least one of the one or more software methods returns;
- comparing the reference count of the software object when the at least one of the one or more software methods is called to the reference count of the software object when the at least one of the one of more software methods returns; and
- identifying the at least one of the one or more software methods as a cause of a memory leak if the reference count when the at least one of the one or more software methods is called is not equal to an expected value when the at least one of the one or more software methods returns.

12. The computer program product of claim 7 wherein the operations further comprise maintaining a table, the table including the reference count and a memory address of the software object.

13. A system for detecting memory leaks comprising:
- at least one processor;
- at least one memory coupled to the at least one processor;
- computer program instructions stored on the memory, which, when executed by the processor, cause the processor to perform operations comprising:
- instrumenting one or more software methods to increment and decrement a reference count of a software object;
- setting the reference count of the software object to a predetermined count when the software object is created;
- executing, by a memory leak detection system, the one or more software methods instrumented to increment and decrement the reference count of the software object, wherein incrementing the reference count of the software object comprises one or more of:
  - incrementing the reference count when the software object is passed as an argument to a method;
  - incrementing the reference count when the software object is assigned to a field;
  - incrementing the reference count when the software object is assigned to a local variable; and
  - incrementing the reference count when the software object is assigned to a static variable;
- when the one or more software methods return from execution, determining whether the reference count is set to the predetermined count.

14. The system of claim 13 wherein decrementing the reference count of the software object comprises one or more of:
- decrementing the reference count when a method returns, wherein the software object was passed as an argument to the method;
- decrementing the reference count when an LValue having the value of the software object is assigned a different value; and
- decrementing the reference count when the software object is a local variable and the program execution leaves the scope of the software object.

15. The system of claim 13 wherein the operations further comprise identifying at least one of the one or more software methods responsible for incrementing or decrementing the reference count.

16. The system of claim 15 wherein identifying the at least one of the one or more software methods includes:
- generating a call graph including:
- the one or more software methods;
- the reference count at the time at least one of the one or more software methods was called; and
- the reference count at the time the at least one of the one or more software methods returned.

17. The system of claim 15 wherein identifying the at least one of the one or more software methods includes:
- monitoring an invocation path of the one or more software methods;
- monitoring the reference count when the at least one of the one or more software methods is called;
- monitoring the reference count when the at least one of the one or more software methods returns;
- comparing the reference count of the software object when the at least one of the one or more software methods is called to the reference count of the software object when the at least one of the one of more software methods returns; and
- identifying the at least one of the one or more software methods as a cause of a memory leak if the reference count when the at least one of the one or more software methods is called is not equal to an expected value when the at least one of the one or more software methods returns.

* * * * *